United States Patent [19]

Mazurek

[11] Patent Number: 5,589,217

[45] Date of Patent: Dec. 31, 1996

[54] REDUCED CALORIE FAT COMPONENT

[75] Inventor: Harry Mazurek, Bala Cynwyd, Pa.

[73] Assignee: ARCO Chemical Technology, L.P., Greenville, Del.

[21] Appl. No.: 439,167

[22] Filed: May 11, 1995

[51] Int. Cl.⁶ ...................................... A23D 9/02
[52] U.S. Cl. ............................ 426/611; 426/804
[58] Field of Search ..................... 426/611, 804

[56] References Cited

U.S. PATENT DOCUMENTS

| | | | |
|---|---|---|---|
| 4,849,242 | 7/1989 | Kershner | 426/601 |
| 4,861,613 | 8/1989 | White et al. | 426/611 |
| 5,059,443 | 10/1991 | Ennis et al. | 426/531 |
| 5,077,073 | 12/1991 | Ennis et al. | 426/531 |
| 5,118,448 | 6/1992 | Cooper | 554/168 |
| 5,135,683 | 8/1992 | Cooper | 554/151 |
| 5,175,323 | 12/1992 | Cooper | 554/164 |
| 5,258,197 | 11/1993 | Wheeler et al. | 426/607 |
| 5,266,346 | 11/1993 | Klemann et al. | 426/611 |
| 5,288,884 | 2/1994 | Cooper | 554/168 |
| 5,298,637 | 3/1994 | Cooper | 554/169 |
| 5,304,665 | 4/1994 | Cooper et al. | 554/149 |
| 5,362,508 | 11/1994 | Wheeler et al. | 426/302 |
| 5,371,253 | 12/1994 | Cooper | 554/173 |
| 5,374,438 | 12/1994 | Yost | 426/497 |
| 5,374,440 | 12/1994 | Chedid et al. | 426/549 |
| 5,378,490 | 1/1995 | Wheeler et al. | 426/606 |
| 5,380,538 | 1/1995 | Wheeler et al. | 426/99 |
| 5,380,544 | 1/1995 | Klemann et al. | 426/607 |
| 5,382,440 | 1/1995 | Sullivan | 426/138 |
| 5,387,429 | 2/1995 | Cooper | 426/611 |
| 5,391,383 | 2/1995 | Sullivan et al. | 426/99 |
| 5,399,729 | 3/1995 | Cooper et al. | 554/149 |

FOREIGN PATENT DOCUMENTS

| | | |
|---|---|---|
| 433016 | 12/1990 | European Pat. Off. . |
| 481523 | 10/1991 | European Pat. Off. . |
| 571219 | 5/1993 | European Pat. Off. . |
| 207070 | 4/1982 | Germany . |
| WO9201386 | 2/1992 | WIPO . |
| WO9210105 | 6/1992 | WIPO . |
| WO9412052 | 6/1994 | WIPO . |
| WO9418290 | 8/1994 | WIPO . |
| WO9419961 | 9/1994 | WIPO . |

OTHER PUBLICATIONS

"Overview of Salatrim, A Family of Low–Calorie Fats", R. Smith et al., *J. Agric. Food Chem.* 1994, 42, 432–434.
"Composition of Representative Salatrim Fat Preparations", Softly et. al., *J. Agric. Food Chem.* 42(2), 461–467 (1994).

*Primary Examiner*—Carolyn Paden
*Attorney, Agent, or Firm*—Stephen D. Harper

[57] ABSTRACT

Low calorie fat components which have a low solids content but a reduced tendency to exhibit the gastrointestinal side effects typically associated with liquid fat substitutes are obtainable by blending esterified propoxylated glycerin materials having a relatively high solids content at 21° C. with certain liquefying agents. The liquefying agents are partially digestible triacylglycerols characterized by the incorporation of both short chain carboxylic acid residues and long chain saturated fatty acid residues. The low calorie fat components have improved organoleptic qualities as compared to the esterified propoxylated glycerin materials alone.

10 Claims, No Drawings

REDUCED CALORIE FAT COMPONENT

FIELD OF THE INVENTION

This invention relates to fat components which are useful in the preparation of reduced calorie food products. More particularly, the invention pertains to blends of digestion resistant esterified propoxylated glycerins with partially digestible liquefying agents. Such blends are low in caloric content and have excellent mouthfeel and other organoleptic qualities, yet exhibit a surprisingly reduced tendency to cause gastrointestinal side effects.

BACKGROUND OF THE INVENTION

A wide variety of substances have been proposed for use as fat substitutes in food compositions. The chemical structures of such substances are selected such that they are more resistant to breakdown by the metabolic processes of the human digestive system which normally occur upon ingestion of conventional triglyceride lipids. Because of their increased resistance to digestion and absorption, the number of calories per gram available from the fat substitutes is considerably reduced as compared to common vegetable oils, animal fats, and other triglyceride lipids. The use of such substances thus enables the preparation of food compositions which are limited in calories derived from fat.

U.S. Pat. No. 4,861,613 describes the preparation of one class of particularly useful fat substitutes wherein a polyol such as glycerin is alkoxylated with an epoxide such as propylene oxide and then esterified with any of a number of fatty acids or equivalents thereof to form an esterified alkoxylated polyol. These substances have the physical and organoleptic properties of conventional triglyceride lipids, yet are significantly lower in available (absorbed) calories than edible oils owing to their pronounced resistance towards pancreatic lipase enzymatic hydrolysis. The thermal and oxidative stability of the esterified alkoxylated polyols renders them especially suitable for use in the preparation of reduced calorie food compositions requiring exposure to high temperatures.

Unfortunately, as a consequence of their hydrolytic stability and low digestibility, the esterified alkoxylated polyols described in U.S. Pat. No. 4,861,613 which are substantially liquid at body temperature may tend to cause certain undesirable gastrointestinal side effects when consumed at high levels in the diet. That is, since such esterified alkoxylated polyols are not readily broken down into simpler substances upon ingestion, they largely retain their oily, fat-like character and pass through the digestive tract in substantially unaltered form. Problems with diarrhea, leakage of the fat substitute through the anal sphincter (sometimes referred to as "passive oil loss"), and separation of the fat substitute as an oil from the excreted fecal matter can occur as a result of the non-digestibility of the fat substitute. Liquid fat substitutes other than esterified alkoxylated polyols which are similarly resistant towards digestion are known to produce comparable gastrointestinal side effects. Examples include sucrose polyester which is esterified with up to 8 fatty acid groups; see U.S. Pat. Nos. 3,954,976, 4,005,195, 4,005,196, and 5,006,360. Obviously, such problems will greatly limit the maximum usage level of these substances which can be tolerated in various food compositions, thereby constraining the amount of conventional triglyceride and the number of calories which can be removed from certain foods.

European Patent Publication No. 571,219 proposes the use of certain esterified propoxylated glycerin fat substitutes which have a particular distribution of fatty acids incorporated therein to achieve a minimum solids content at 27° C. as a means of alleviating such gastrointestinal side effects. As a result of their relatively high solids content, however, such substances may tend to have an undesirable waxy or greasy mouthfeel, thereby limiting their utility in food products which normally require the incorporation of a liquid oil as the fat component. EP 571,219 suggests that this problem may be alleviated by combining the esterified propoxylated glycerin with a liquid triglyceride lipid; for example, fine particles of the fat substitute may be advantageously dispersed in a matrix of the liquid triglyceride lipid. Such a solution, however, is not entirely satisfactory since the caloric content of the esterified propoxylated glycerin is increased considerably by the addition of the triglyceride, which contains 9 calories per gram. That is, one can improve the organoleptic qualities of the esterified propoxylated glycerin by such blending, but at the expense of a less significant reduction in calories than would be achieved if the esterified propoxylated glycerin could be used as the sole fatty material in the food product.

SUMMARY OF THE INVENTION

This invention provides a reduced calorie fat component comprised of a digestion resistant esterified propoxylated glycerin having a relatively high solids content and a partially digestible liquefying agent having a relatively low solids content.

The esterified propoxylated glycerin has a dilatometric solid fat index of at least 50° at 21° C. and at least 10° at 37° C. and structure

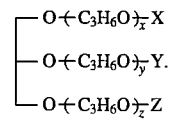

wherein x, y, and z are each at least 1, the sum of x+y+z is from 3 to 21, and X, Y, and Z are the same or different and are selected from the group consisting of H
and

where R is a $C_4$–$C_{23}$ aliphatic group, subject to the proviso that at least two of X, Y, or Z are

The partially digestible liquefying agent is a triacylglycerol (or a mixture of triacylglycerols) bearing both at least one $C_2$–$C_4$ carboxylic acid residue and at least one $C_{16}$–$C_{24}$ saturated fatty acid residue and having a dilatometric solid fat index of less than 50° at 21° C. and less than 10° at 37° C.

An amount of the partially digestible liquefying agent sufficient to reduce the dilatometric solid fat index of the fat component to less than 50° at 21° C. and less than 10° at 37° C. is combined with the esterified propoxylated glycerin.

DETAILED DESCRIPTION OF THE INVENTION

The esterified propoxylated glycerin may be any of such substances known in the art which have a solid fat index (as measured by dilatometry) of greater than 50° at 21° C. (ca. room temperature) and greater than 10° at 37° C. (average human body temperature) which are resistant to digestion. In this context, "digestion resistant" means that metabolic breakdown and absorption of the esterified propoxylated glycerin is hindered to the extent that the compound provides less than 3 kilocalories of energy per gram when orally ingested by a human, as compared to the 9 kilocalories of energy per gram derived from conventional triglyceride lipids. In a preferred embodiment, the esterified propoxylated glycerin furnishes less than 1 kilocalorie per gram of energy. The esterified propoxylated glycerins suitable for use in the fat component of this invention have a relatively high solid fat index at room temperature; the SFI may, for example, be 50, 60, 70 or even higher at 21° C. Such materials can consequently be quite hard and "waxy" at ambient temperatures; the organoleptic qualities of food compositions containing esterified propoxylated glycerin fat substitutes of this type alone may often be adversely affected. Incorporation of the liquefying agent renders these esterified propoxylated glycerins considerably softer in consistency and thus more pleasing to the palate in certain food formulations.

Suitable esterified propoxylated glycerins may be prepared by adaption of any of the synthetic methods known in the art as exemplified by the teachings of U.S. Pat. Nos. 4,861,613, 5,175,323, 4,983,329, 5,304,665, and 5,288,884 and European Pat. Pub. No. 619,291.

Generally speaking, esterified propoxylated glycerin materials meeting the necessary solid fat index criteria may be readily obtained by manipulation of the oxypropylene and fatty acid content of the esterified propoxylated glycerin. The solids content at a given temperature, for example, may be increased by either decreasing the number of oxypropylene units per glycerin or increasing the proportion of long chain saturated fatty acid acyl groups.

Especially preferred for use are esterified propoxylated glycerin fat substitute compositions of the type disclosed in European Pat. Pub. No. 571,219, which contain a relatively high proportion of $C_{20}$–$C_{24}$ saturated linear fatty acid ester groups. Such compositions have an average number of oxypropylene units per equivalent of glycerin of from 3 to 21, a fatty acid acyl group content such that at least 40 mole percent of the fatty acid acyl groups in the composition are derived from a $C_{20}$–$C_{24}$ saturated linear fatty acid, and a solid fat index at 27° C. as measured by dilatometry of at least 30 (to be suitable for use in the present invention, the compositions must also meet the requirement that the SFI be at least 50° at 21° C. and at least 10° at 37° C.). The substances described in EP 571,219 have the desirable property of having a reduced tendency to display gastrointestinal side effects when ingested as compared to other types of esterified propoxylated glycerin fat substitutes.

Such substances are obtainable by alkoxylating glycerin with from 3 to 21 equivalents of propylene oxide per equivalent of glycerin, preferably under base-catalyzed conditions, to yield a propoxylated glycerin composition and esterifying the propoxylated glycerin composition with at least one fatty acid or fatty acid equivalent, selected such that the resulting fatty acid-esterified propoxylated glycerin composition has a solid fat index at 27° C as measured by dilatometry of at least 30 and a fatty acid acyl group content wherein at least 40 mole percent (more preferably, at least 60 mole percent) of the fatty acid acyl groups are derived from one or more $C_{20}$–$C_{24}$ saturated linear fatty acids. "Derived from" in this context means that the acyl group has a long chain hydrocarbyl structure analogous to that present in a $C_{20}$–$C_{24}$ saturated linear fatty acid.

Preferred $C_{20}$–$C_{24}$ saturated fatty acids are linear (i.e., non-branched) and contain only one carboxylic acid functionality. The acyl group may thus correspond to the general structure

wherein n is an integer of from 18 to 22. The value of n is most conveniently an even number (e.g., 18, 20, or 22) since the corresponding fatty acids are readily available at low cost from natural sources such as edible triglycerides. Specific illustrative fatty acids suitable for use include, but are not limited to eicosanoic (arachidic) acid, heneicosanoic acid, docosanic (behenic) acid, tricosanoic acid, and tetracosanoic (lignoceric) acid. Mixtures of these $C_{20}$–$C_{24}$ saturated fatty acids may also be utilized to advantage. The long chain saturated fatty acid most preferred for use is behenic acid (i.e., the acyl group has the structure

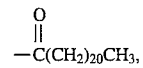

both because it effectively imparts desirable physiological properties to an esterified propoxylated glycerin composition and because it is readily available by hydrogenation of the erucic acid derived from the triglycerides present in high erucic acid rapeseed oil, crambe oil, and certain fish oils.

While all of the acyl groups in the preferred esterified propoxylated glycerin composition may be derived from $C_{20}$–$C_{24}$ saturated linear fatty acids, up to 60 mole % of the acyl groups may be derived from other $C_5$–$C_{24}$ fatty acids. Preferably, the proportion of such other acyl groups is less than 40 mole %. Generally speaking, the incorporation of acyl groups which are relatively short in length ($C_5$–$C_{18}$), unsaturated, and/or branched will tend to lower the solid fat index at 27° C. of the resulting esterified propoxylated glycerin.

The fatty acids which optionally may be used in combination with the $C_{20}$–$C_{24}$ saturated linear fatty acids may be any of the known fatty acids such as caprylic acid, pelargonic acid, capric acid, lauric acid, palmitic acid, stearic acid, oleic acid, cetoleic acid, myristic acid, palmitoleic acid, gadoleic acid, erucic acid, rincinoleic acid, linoleic acid, linolenic acid, myristoleic acid, eleostearic acid, arachidonic acid, or mixtures or hydrogenated derivatives of these acids. Preferably, linear monocarboxylic acids containing from 0 to 5 double bonds are employed. In one embodiment, from 1 to 10 mole % of the acyl groups are derived from unsaturated carboxylic acids (for example, $C_{18}$ unsaturated fatty acids such as oleic acid, linoleic acid, and linolenic acid).

The liquefying agent used in preparing the fat component of the invention may be any partially digestible triacylglycerol or mixture of triacylglycerols having a dilatometric solid fat index of less than 50° at 21° C. and less than 10° at 37° C.

Suitable triacylglycerols for this purpose bear both $C_2$–$C_4$ carboxylic acid residues and $C_{16}$–$C_{24}$ saturated fatty acid residues.

It has been unexpectedly discovered that such compounds effectively modify the melting profile of the esterified propoxylated glycerin previously described so as to provide a fat component which is significantly more acceptable in terms of mouthfeel than the esterified propoxylated glycerin alone, yet do not increase the tendency of the fat component to cause gastrointestinal side effects (unlike highly liquid esterified propoxylated glycerin materials) or the caloric content of the fat component (unlike conventional triglyceride lipids). The solids content of the fat component over the temperature range between ambient temperature and body temperature (21° C. to 37° C.) is sufficiently decreased such that the fat component imparts a less waxy or greasy mouthfeel when consumed as part of a food product. The liquefying agent, as a consequence of its partial digestibility, is sufficiently metabolized by the body or converted into more hydrophilic substances by the time the fat component exits the lower gastrointestinal tract that it does not contribute significantly to passive oil loss through the anal sphincter, yet at the same time provides less than the 9 kilocalories per gram which would have been supplied by a conventional triglyceride lipid. The esterified propoxylated glycerin remains in substantially unaltered form upon passage through the digestive system, but does not, because of its high solids content and the presence of long chain saturated fatty acid residues, tend to "leak" as an oil or otherwise provoke gastrointestinal side effects.

In this context "partially digestible" means that the liquefying agent has a caloric content of from 3 to 7 kilocalories per gram. At 3 kilograms per gram or less, the liquefying agent would contribute to oil leakage, while above 7 kilocalories per gram little advantage would be realized over a liquid vegetable or animal fat. Suitable partially digestible triacylglycerols meeting the structural and solid fat index criteria set forth in the Summary of the Invention is known in the art. For example, certain members of the family of low calorie fats developed by Nabisco Food Group under the generic name "SALATRIM" may be employed as the liquefying agent component of the present invention. The synthesis and chemical composition of such materials are described in the following patents and publications (all of which are incorporated herein by reference in their entirety): Smith et al., "Overview of SALATRIM, a Family of low-Calorie Fats, " *J. Agric. Food Chem.*, 42,432–434 (1994); Henderson et al., "Quantitation and Structure Elucidation . . .", *J. Agric. Food Chem.*, 42, 435–441 (1994); Klemann et al., "Random Nature of Triacygycerols . . .", *J. Agric. Food Chem.*, 42, 442–446 (1994); Softly et al., "Composition of Representative SALATRIM Fat Preparations,", *J. Agric. Food Chem.*, 42, 461–467 (1994); PCT International Application No. WO 92/10105; and U.S. Pat. Nos. 5,258,197 (Wheeler et al.), 5,362,508 (Wheeler et al.), 5,374,440 (Chedid et al.), 5,391,383 (Sullivan et al.), 5,378,490 (Wheeler et al.), 5,380,544 (Klemann et al.), 5,380,538 (Wheeler et al.), 5,374,438 (Yost), and 5,382,440 (Sullivan), and 5,407,695 (Wheeler et al.); and PCT International Applications Nos. WO 94/18290 and WO 94/12052.

The triacylglycerols contain both long, saturated, preferably $C_{16}$ to $C_{22}$, acid residues and short, preferably $C_2$ to $C_4$, acid residues. Most preferably, the long chain fatty acid residues will be $C_{18}$ and the short chain acid residues will be $C_2$ to $C_3$.

Denoting the aliphatic portion of the long fatty acid substituent as $R^5$ and the short as $R^4$, the triacylglycerols comprise one or more SSL, SLS, LLS, and LSL species described by the following formulae:

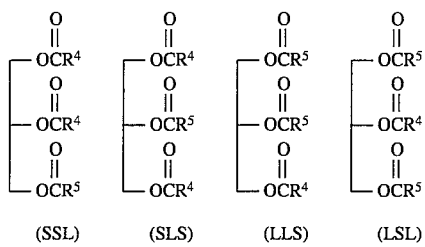

where each $R^5$, independently, is a long chain saturated hydrocarbon group having between 15 and 23 carbons, preferably 17 to 21 carbons; and each $R^4$, independently, is a short chain hydrocarbon group having 1 to 3 carbons, preferably 1 to 2 carbons. The identities of the $R^4$ and $R^5$ groups and the relative proportions of SSL, SLS, LLS, and LSL species are selected so as to provide the desired solid fat index profile. Preferably, mixtures of different triacylglycerols are utilized.

Depending upon the preparative procedure (to be more fully described below), the mixtures may also contain triacylglycerols of the formulae

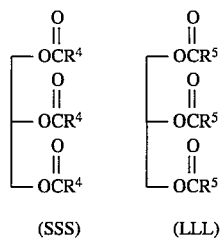

where $R^4$ and $R^5$ are as defined above. However, preferred mixtures contain essentially no SSS and preferably less than 2%, more preferably less than 1% LLL.

As depicted above, the triacylglycerols employed in this invention are compounds consisting of three molecules of the same or different acids esterified to one molecule of glycerol. The acids are $C_2$ to $C_4$ acids, or long and saturated $C_{16}$ to $C_{24}$ acids.

One preferred embodiment is a mixture of at least two of the above described triacylglycerols, at least one bearing two different short chain acid residues. Another preferred embodiment is a mixture of at least two triacylglycerols each bearing a similar array of long, saturated residues but a different complement of short chain acid residues.

Short chain acid residues may be either saturated or unsaturated, straight or branched. Short chain acid residues may be derived from any synthetic or natural organic acid including, but not limited to acetic (ethanoic), propionic (propanoic), butyric (butanoic), valeric (pentanoic), glycolic (hydroxyacetic), lactic (2-hydroxypropanoic), hydracrylic (3-hydroxypropanoic), hydroxybutyric, hydroxpentanoic, and the like acids. As used herein, chemical names include isomeric variations; for example, "butyric acid" includes normal-butyric acid (butanoic) and iso-butyric (2-methylpropanoic) acid, "valeric acid" includes normal-valeric (pentanoic) and iso-valeric (3-methylbutanoic), and so forth. Preferred acids are acetic, propionic, and butyric acids and mixtures of these. Acetic and propionic acids are especially preferred.

Mixtures of acids may also be used, such as, for example, those derived from specific fractions of unhydrogenated, partially hydrogenated or fully hydrogenated dairy butterfat, coconut, palm kernel and the like oils.

The triacylglycerols generally contain 33 to 67 mole % short chain acid residues. The triacylglycerols can contain amounts of medium or long, unsaturated fatty acid residues to the extent these can be tolerated without unduly affecting the physical properties of the fat, or the caloric reduction. For example, some triacylglycerols may contain up to 25% medium and/or long, unsaturated fatty acid residues.

The long chain fatty acid residue has from 16 to 24, more narrowly, 18 to 22, and even more narrowly 18 to 20 carbons. In one embodiment, the long chain fatty acid residues contain predominately ($\geq$70 to 80%, or higher) 18 carbons (stearic acid residues). In another embodiment the long chain fatty acid residues $\geq$90% $C_{18}$ (stearic acid residue) groups.

The long chain fatty acid residues may be derived from any synthetic or natural, straight or branched saturated organic acid including, but not limited to, palmitic (hexadecanoic), stearic (octadecanoic), arachidic (eicosanoic), behenic (docosanoic), lignoceric (tetracosaenoic), cerotic (hexacosanoic), montanic (octacosanoic), melissic (triacontanoic), and the like acids. Such residues may also be derived by hydrogenating unsaturated acid residues including, but not limited to, residues derived from palmitoleic (9-hexadecenoic), oleic (cis-9-octadecenoic), elaidic (trans-9-octadecenoic), vaccenic (trans-11-octadecenoic), linoleic (cis-cis-9,12-octadecedienoic), linolenic (9,12,15-octadecatrienoic and 6,9, 12-octadecatrienoic), eleostearic (9,11,13-octadecatrienoic), arachidonic (5,8,11,14-eicosatetraenoic), nervonic (cis-15-tetracosenoic), eicosapentaenoic, docosatetraenoic, docosapentaenoic, docosahesaenoic, and the like acids. Chemical names include isomeric variations.

The various long chain fatty acid residues can be mixtures of fatty acid residues such as, for example, those obtainable from non-hydrogenated, partially hydrogenated or fully hydrogenated oils such as soybean, safflower, sunflower, high oleic sunflower, sesame, peanut, corn, oil, rice bran, babassu nut, palm, mustard seed, cottonseed, poppyseed, low erucic rapeseed (canola), high erucic rapeseed, shea, marine, meadowfoam and the like oils. Preferred oils are hydrogenated, preferably fully hydrogenated. Hydrogenated fats having at least about 70%, preferably at least about 75%, stearic acid residues such as hydrogenated peanut oil, hydrogenated olive oil, hydrogenated soybean oil, hydrogenated sesame oil, and hydrogenated corn oil are especially desirable for some embodiments. Other embodiments employ hydrogenated fats having at least 90% stearic acid residues, such as hydrogenated sunflower oil, hydrogenated safflower oil and hydrogenated canola. Fatty acids derived from processed or unprocessed tallow, lard, shea butter, and dairy butter, or plant waxes such as jojoba may also be used. Specific fractions of processed or unprocessed oils, fats, or waxes may be used, and are especially advantageous in some embodiments.

The oils, fats, or waxes may be hydrogenated before or after incorporation into the triacylglycerols. The mixtures can contain amounts of medium or unsaturated long fatty acids to the extent which these can be tolerated without unduly affecting the physical properties of the fat, or the caloric reduction. For example, some triacylglycerols suitable for use in the present invention may contain up to 20% medium and/or unsaturated long fatty acids. The caloric reduction is best taken advantage of when the level of these acids is maintained at less than 15%, more desirably less than 10%.

Certain of the triacylglycerols usable in this invention may be described by the formula

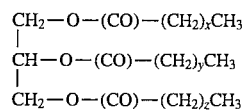

where
x, y, and z=n or m
n=0, 1, 2, or 3,
m=16, 18, 20 or 22, and
14$\leq$(x+y+z)$\leq$47.

The long and short substituents are selected to provide a discernible fatty character in the triacylglycerols. Functional properties can be modulated by the selection of S and L groups as well as by the proportions of SSS, SLS, SSL, LLS, LSL, and LLL components in mixtures of the triacylglycerols.

The molar ratio of S to L groups in the triacylglycerols may be determined using proton or carbon nuclear magnetic resonance, or any quantitative procedure known to those skilled in the art. The S/L ratio should be selected to be between 1.0 and 2.0, more preferably between 1.5 and 2.0 since the resulting triacylglycerols will generally have the solid fat index characteristics necessary to achieve the desired organoleptic modification of the esterified propoxylated glycerin when incorporated into the fat components of the present invention.

The triacylglycerols used in the reduced calorie fat components of this invention may be prepared using synthetic procedures known to those skilled in the art, such as, for example, directly esterifying glycerol or glycerol esters with fatty acids, fatty acid halides (notably chlorides) or fatty acid anhydrides, transesterifying glycerol with fatty acid esters, or interesterifying long and short chain triglycerides for such time and under such conditions that triacylglycerols bearing long and short chain acid residues form. Starting materials for triacylglycerol preparations may be obtained commercially or isolated from natural sources. Alternatively, suitable triacylglycerols may be isolated from natural or processed fats or oils, or fractions thereof, as discussed above.

Some desirable triacylglycerol mixtures are prepared using a random interesterification of triacetin, tripropionin and/or tributyrin with a substantially hydrogenated fat having at least about 70%, in some cases at least about 75%, more preferably at least about 90%, stearic acid residues.

The solid fat index of the triacylglycerol liquefying agent may be readily maintained at the desired value by manipulation of the chemical composition of the liquefying agent. For example, increasing the proportion of unsaturated or polyunsaturated fatty acid acyl groups relative to saturated fatty acyl groups, increasing the number of different fatty acid residues, increasing the proportion of short chain acid (e.g., $\leq C_4$) relative to long chain fatty acid residues ((e.g., $\geq C_{18}$), or increasing the proportion of branched acid residues relative to linear (straight chain) acid residues will generally, all other factors being the same, tend to lower the solid fat index at a given temperature.

The amount of liquefying agent combined with the esterified propoxylated glycerin must be sufficient to provide a reduced calorie fat component having a dilatometric solid fat index of less than 50° at 21° C. and less than 10° at 37° C. The minimum quantity required for this purpose will vary depending upon a number of factors, including the individual solids content of each component, but may be readily determined by standard experimental techniques. For example, mixtures of liquefying agent and esterified propoxylated glycerin may be prepared by blending the two components, preferably under conditions such that both ingredients are fully liquified (melted) to form a homogeneous mass. The solid fat index at 21° C. and 37° C. of the blend is measured using standard dilatometric procedures (i.e., in accordance with A.O.C.S. Official Method Cd 10-57). The proportion of liquefying agent relative to esterified propoxylated glycerin is incrementally increased until the solid fat index drops below 50° at 21° C. and below 10° at 37° C. An excess of liquefying agent may advantageously be used, particularly when it is also desired to lower the solid fat index of the esterified propoxylated glycerin at a certain temperature or range of temperatures so as to render the fat component more suitable for use in a particular food formulation. For example, a food product which requires the use of a fat which is a free-flowing clear liquid at room temperature may favor the selection of a fat component in accordance with this invention which has a liquefying agent concentration greater than the minimum level needed to depress the SFI at 21° C. below 50. At the same time, it will generally be desirable, unless necessitated by the characteristics of the food product being formulated, to minimize the proportion of liquefying agent employed so as to keep the caloric content of the resulting food product as low as possible. Generally speaking, weight ratios of from 1:99 to 99:1 (liquefying agent: esterified propoxylated glycerin) may be utilized, consistent with the requirement that the solid fat index of the fat content be maintained below 50 at 21° C. and below 10 at 37° C. Weight ratios of from 20:80 to 80:20 may be particularly useful.

The liquefying agent and the esterified propoxylated glycerin may be synthesized separately and then combined using any appropriate technique such as milling, melt-blending, or the like.

The fat components of this invention may be used as partial or total (100%) replacements for conventional lipids (triglycerides) in any edible fat-containing food composition. The amount of the fat component employed is sufficient to effectively reduce the available calories of the food composition as compared to a food composition prepared using an equivalent amount (weight or volume) of a conventional fully digestible triglyceride lipid alone. Preferably, at least about 25 percent (more preferably, at least about 50 percent by weight; most preferably, 100 percent by weight) of the total fat content of the food composition is comprised of the present fat component.

The fat component of this invention can replace, in full or in part, a triglyceride lipid in a cooking oil, salad oil, spray oil, or shortening, for example. Additional uses include combining the fat component with other foodstuff ingredients to form food compositions such as frozen desserts (e.g., sherbet, ice cream, frozen yogurt, milk shakes), baked goods (cakes, doughnuts, muffins, brownies, breads, pies, rolls, pastries, cookies, biscuits, crackers), nut butters (peanut butter), dairy products (margarine, sour cream, coffee lighteners, cheese, cheese spreads, flavored dips, filled cream, filled milk), mayonnaise, salad dressing, savory snacks (potato chips, corn chips, cheese puffs, pretzels), reformed and comminuted meats (lunch meats, sausage, hot dogs, hamburger), pet foods, meat and egg substitutes or extenders, whipped toppings, gravies and other sauces, frostings, fillings, icings, cocoa butter replacements or blends, candies (especially those normally containing fatty ingredients such as chocolate or peanut butter), soups, and dry baking mixes (for muffins, cakes, pancakes, waffles, brownies, and the like). Owing to the fat-like properties and stability of the fat components, minimum reformulation of standard food compositions will generally be required. The viscosity, melting profile, yield point, hardness, thixotropic area, liquid/solid stability, solid fat index (at different temperatures), and other physical properties of the fat component are preferably selected such that they mimic as closely as possible the analogous properties of the conventional triglyceride being replaced.

Illustrative ingredients which may be used in combination with the fat component of this invention include non-fat ingredients and fatty ingredients such as carbohydrates (flour, starches, sugars, celluloses), edible lipids (triglycerides), proteins (from animal or vegetable sources), vitamins, antioxidants, emulsifiers, thickeners, preservatives, colorants, flavors, fragrances, sugar substitutes (saccharin, aspartame, sucralose, cyclamates, and the like), other fat substitutes or fat mimetics (for example, sucrose polyester, sorbitol polyester or caprenin), water, milk, spices, eggs, and the like. Oil-in-water or water-in-oil emulsions can be readily prepared by combining water, the fat component and, optionally, other ingredients such as emulsifiers. In a preferred embodiment which helps minimize the caloric value and fat content of the food composition, the food composition is characterized by the absence of a triglyceride lipid (i.e., a conventional fat or oil).

From the foregoing description, one skilled in the art can readily ascertain the essential characteristics of this invention and, without departing from the spirit and scope thereof, can make various changes and modifications of the invention to adapt it to various usages, conditions, and embodiments.

The following examples further illustrate the components and food compositions of this invention, but are not limitative of the invention in any manner whatsoever.

EXAMPLES

Esterified Propoxylated Glycerins

EPG-1: Prepared by fully esterifying a propoxylated glycerin containing an average of approximately 8 equivalents of propylene oxide (i.e., about 8 oxypropylene segments) per glycerol residue with a mixture of ca.85% behenic acid and ca. 15% stearic acid. SFI: at 21° C.=81, at 27° C.=76.

EPG-2: Prepared by fully esterifying a propoxylated glycerin containing an average of approximately 8 equivalents of propylene oxide per glycerol residue with 3 parts of a mixture of ca.85% behenic acid and ca. 15% stearic acid and 1 part of a mixture of soybean fatty acids. SFI: at 21° C.=52, at 27° C.=40.

EPG-3: Prepared by fully esterifying a propoxylated glycerin containing an average of approximately 5 equivalents of propylene oxide per glycerol residue with a mixture of hydrogenated high erucic acid rapeseed oil fatty acids (85%) and hydrogenated canola oil fatty acids (15%). SFI: at 21° C.=86, at 27° C.=67, at 37° C.=18.

EPG-4: Prepared by fully esterifying a propoxylated glycerin containing an average of approximately 8 equivalents of propylene oxide per glycerol residue with 3 parts by weight of a 85/15 behemic acid/stearic acid blend and 1 part by weight stearic acid. SFI: at 21° C.=75, at 27° C.=71.

EPG-5: Prepared by fully esterifying a propoxylated glycerin containing an average of approximately 5 equivalents of propylene oxide per glycerol residue with a mixture of 9 parts hydrogenated high erucic acid rapeseed oil fatty acids and 1 part soybean oil fatty acids. SFI at 21° C.=67, at 37° C.=28.

Triacylglycerol Liquefying Agents

LA-1: A triacylglycerol bearing both butyric and stearic acid residues having an S/L ratio of 2.0 prepared in accordance with Example 16 of PCT International Application No. WO 91/09296

LA-2: A triacylglycerol prepared by interesterification of hydrogenated canola oil with tributyrin in accordance with Example 20 of PCT International Application No. WO 91/09296, wherein a hydrogenated canola: tributyrin molar ratio of 1:4 is used (S/L ratio=1.5)

LA-3: "SALATRIM 32CA" triacyl glycerol prepared by interesterification of hydrogenated canola oil, tripropionin, and triacetin in accordance with Example 36 of PCT International Application No. WO 91/09296, wherein the molar ratio of hydrogenated canola: tripropionin: triacetin is 1:11:1 and the S/L ratio is 1.8.

LA-4: A triacylglycerol prepared by random interesterification of hydrogenated soybean oil with 2.5 moles of tributyrin in accordance with Example 2 of U.S. Pat. No. 5,382,440.

LA-5: A triacyl glycerol prepared by random interesterification of 1 mole of hydrogenated canola oil with 2.4 moles triacetin, 4.8 moles tripropionin, and 4.8 moles tributyrin in accordance with Example 4 of PCT International Application No. WO94/01145.

Fat Components

Fat components in accordance with the present invention are prepared by melt-blending combinations of the above-listed esterified propoxylated glycerins and liquefying agents in the proportions shown in Table 1.

TABLE I

| Fat Component No. | Esterified Propoxylated Glycerin | Wt % | Liquefying Agent | Wt % |
|---|---|---|---|---|
| FC-1 | EPG-1 | 60 | LA-1 | 40 |
| FC-2 | EPG-2 | 90 | LA-2 | 10 |
| FC-3 | EPG-3 | 75 | LA-3 | 25 |
| FC-4 | EPG-4 | 85 | LA-4 | 15 |
| FC-5 | EPG-5 | 80 | LA-5 | 20 |
| FC-6 | EPG-1 | 70 | LA-5 | 30 |
| FC-7 | EPG-2 | 85 | LA-4 | 15 |
| FC-8 | EPG-3 | 50 | LA-3 | 50 |
| FC-9 | EPG-4 | 65 | LA-2 | 35 |
| FC-10 | EPG-5 | 40 | LA-1 | 60 |

The utility of the fat components of this invention as reduced calorie fat substitutes is demonstrated by the preparation of cookies using the following procedure:

|  | parts by weight |
|---|---|
| To prepare the cookies, mix | |
| granulated sugar | 72.0 |
| brown sugar | 22.5 |
| nonfat dry milk | 2.3 |
| salt | 2.8 |
| sodium bicarbonate | 2.3 |
| and then add | |
| Fat Component (any of FC-1 through FC-10) | 90.0 |
| Add high fructose corn syrup | 3.4 |
| then ammonium bicarbonate | 1.1 |
| to water | calculated* |
| and add the water mixture to the Fat Component mixture. | |
| Add flour | calculated* |
| Sheet and cut the dough into the desired shape. | |
| Bake at 400° C. for 10 minutes (or until done) in a preheated oven | |

*pbw flour = [(100 − 13% moisture basis)/(100 − flour moisture %)] 225 pbw
pbw water = 225 pbw − pbw flour added + 49.5 pbw For comparative purposes, cookies are also prepared using the above-described procedure, but using 90.0 parts by weight of the EPG present in each Fat Component in place of the Fat Component. In each case, the cookies thus obtained are predicted to have a "drier" (less rich) mouthfeel and texture than the cookies prepared using the corresponding Fat Component.

I claim:

1. A reduced calorie fat component comprised of (a) a digestion resistant esterified propoxylated glycerin having a dilatometric solid fat index of at least 50° at 21° C. and at least 10° at 37° C. and structure

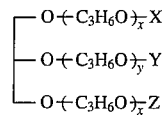

wherein x, y, and z are each at least 1, the sum of x+y+z is from 3 to 21, and X, Y, and Z are the same or different and are selected from the group consisting of H and

wherein R is a $C_4$–$C_{23}$ aliphatic group and at least two of X, Y, or Z are

and (b) a triacylglycerol bearing both at least one $C_2$–$C_4$ carboxylic acid residue and at least one $C_{16}$–$C_{24}$ saturated fatty acid residue and having a dilatometric solid fat index of less than 50° at 21° C. and less than 10° at 37° C.; wherein the triacylglycerol is present in the reduced calorie fat component in an amount effective to provide a dilatometric solid fat index of less 50° at 21° C. and less than 10° at 37° C.

2. The reduced calorie fat component of claim 1 wherein each

is derived from $C_5$–$C_{24}$ fatty acids.

3. The reduced calorie fat component of claim 1 wherein each

is derived from a fatty acid selected from the group consisting of $C_{20}$–$C_{24}$ saturated linear fatty acids, $C_5$–$C_{19}$ fatty acids, $C_{20}$–$C_{24}$ unsaturated fatty acids and $C_{20}$–$C_{24}$ branched fatty acids, provided at least one

(group in the esterified propoxylated glycerin is derived from a $C_{20}$–$C_{24}$ saturated linear fatty acid.

4. The reduced calorie fat component of claim 1 wherein, X, Y, and Z are each $$-\overset{O}{\underset{\|}{C}}R.$$

5. The reduced calorie fat component of claim 1 wherein the digestion resistant esterified propoxylated glycerin has a dilatometric solid index of at least 30° at 27° C.

6. The reduced calorie fat component of claim 1 wherein the digestion resistant esterified propoxylated glycerin provides less than 3 kilocalories of energy per gram.

7. The reduced calorie fat component of claim 1 wherein the triacylglycerol provides from 3 to 7 kilocalories of energy per gram.

8. The reduced calorie fat component of claim 1 comprised of the digestion resistant esterified propoxylated glycerin and a mixture of at least two different triacylglycerols selected from the group consisting of:

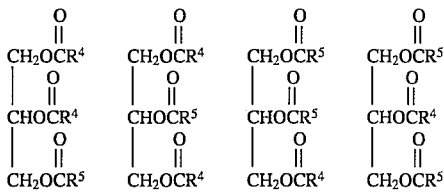

wherein the $R^5$ groups are, independently, long chain saturated hydrocarbon groups having from 15 to 23 carbons and the $R^4$ groups comprise at least two different short chain hydrocarbon groups having 1 to 3 carbons.

9. The reduced calorie fat component of claim 1 comprised of the digestion resistant esterified propoxylated glycerin and at least one triacylglycerol selected from the group consisting of:

(a) triacylglycerols bearing a mixture of acetic acid residues and saturated $C_{16}$ to $C_{24}$ acid residues;

(b) triacylglycerols bearing a mixture of propionic acid residues and saturated $C_{16}$ to $C_{24}$ acid residues;

(c) triacylglycerols bearing a mixture of butyric acid residues and saturated $C_{16}$ to $C_{24}$ acid residues;

(d) triacylglycerols bearing a mixture of acetic acid residues, propionic acid residues, and saturated $C_{16}$ to $C_{24}$ acid residues;

(e) triacylglycerols bearing a mixture of acetic acid residues; butyric acid residues, and saturated $C_{16}$ to $C_{24}$ acid residues;

(f) triacylglycerols bearing a mixture of propionic acid residues, butyric acid residues, and saturated $C_{16}$ to $C_{24}$ acid residues; and (g) triacylglycerols bearing a mixture of acetic acid residues, propionic acid residues, butyric acid residues, and saturated $C_{16}$ to $C_{24}$ acid residues.

10. A reduced calorie fat component comprised of (a) a digestion resistant esterified propoxylated glycerin providing less than 3 kilocalories of energy per gram and having a dilatometric solid fat index of at least 50° at 21° C., at least 30° at 27° C., and at least 10° at 37° C. and structure

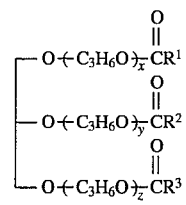

wherein x, y, and z are each at least 1, the sum of x+y+z is from 3 to 15, and $R^1$, $R^2$, and $R^3$ are the same or different and are selected from $C_4$–$C_{23}$ aliphatic groups, provided at least one of $R^1$, $R^2$, and $R^3$ is a $C_{19}$–$C_{23}$ saturated linear aliphatic group; and (b) at least one triacylglycerol providing from 3 to 7 kilocalories of energy per gram selected from the group consisting of:

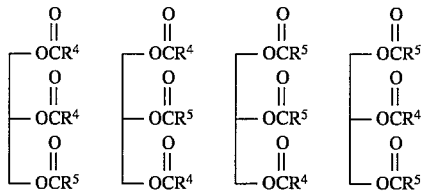

wherein the $R^5$ groups are, independently, long chain saturated hydrocarbon groups having from 15 to 23 carbons and the $R^4$ groups comprise at least two different short chain hydrocarbon groups having from 1 to 3 carbons and having a dilatometric solid fat index of less than 50° at 21°° C. and less than 10° at 37° C.;

wherein the triacylglycerol is present in the reduced calorie fat component in an amount effective to provide a dilatometric solid fat index of less than 50° at 21° C. and less than 10° at 37° C.

* * * * *